United States Patent [19]
Myers

[11] Patent Number: 5,834,986
[45] Date of Patent: Nov. 10, 1998

[54] DIRECT 2ND DERIVATIVE SYNTHESIS METHOD FOR CONTROLLING SIDELOBE ENERGY IN AN MSK MODULATED SIGNAL

[75] Inventor: Michael H. Myers, Poway, Calif.

[73] Assignee: TRW Inc., Redondo Beach, Calif.

[21] Appl. No.: 944,878

[22] Filed: Oct. 6, 1997

[51] Int. Cl.$^6$ .............................. H03C 3/00; H04L 27/12
[52] U.S. Cl. ........................ 332/100; 375/274; 375/305
[58] Field of Search ................................ 332/100, 101, 332/102; 375/274, 305

[56] References Cited

U.S. PATENT DOCUMENTS

| | | | |
|---|---|---|---|
| 3,993,868 | 11/1976 | Balcewicz | 178/66 R |
| 4,135,057 | 1/1979 | Bayless et al. | 178/67 |
| 4,438,413 | 3/1984 | Ryan | 332/100 |
| 4,516,087 | 5/1985 | Bruene | 332/17 |
| 4,897,620 | 1/1990 | Paradise | 332/100 |
| 4,942,592 | 7/1990 | Leitch et al. | 375/90 |
| 5,020,079 | 5/1991 | Vancraevnest | 375/64 |
| 5,170,131 | 12/1992 | Takahiro et al. | 329/300 |

OTHER PUBLICATIONS

Amoroso, Frank, "The Use of Quasi–Bandlimited Pulses in MSK Transmission," Oct. 10, 1979, pp. 1616–1623, IEEE Transactions on Communications.

Amoroso, Frank, "Pulse and Spectrum Manipulation in the Mimimum (Frequency) Shift Keying (MSK) Format," Mar. 1996, pp. 381–384, IEEE Transactions on Communications.

*Primary Examiner*—David Mis
*Attorney, Agent, or Firm*—Michael S. Yatsko

[57] ABSTRACT

A method for generating minimum shift keying (MSK) modulation signals with relatively reduced energy sidelobes relative to known methods. In one embodiment, a second derivative of the phase waveform is taken and convolved with a selectable smoothing function and integrated twice to generate a smooth phase waveform S2D_MSK (i)=where ø (i)=π i d(i)/2T. In the alternate embodiment, the sidelobe energy can be varied by simply changing the smoothing function, which can be stored in a lookup table. In the embodiment, the MSK modulation signal has a constant amplitude envelope allowing it to be transmitted using class C amplifiers. Since the embodiment provides continuous phase derivatives, the frequency and thus the sidelobe energy is sufficiently reduced to minimize interference with cosite equipment and nearby communication channels bands.

22 Claims, 9 Drawing Sheets

FIG. 8a  φ_MSK

FIG. 8b  φ'_MSK

FIG. 8c  φ''_MSK

FIG. 8d  s(t)=(1−cos)/2

FIG. 8e  $u(t)=\phi''(t)\circledast s(t)$

FIG. 8f  $\int u(t)dt$

FIG. 8g  $\int\int u(t)dt$

DIRECT 2ND DERIVATIVE SYNTHESIS METHOD FOR CONTROLLING SIDELOBE ENERGY IN AN MSK MODULATED SIGNAL

BACKGROUND OF THE INVENTION

1. Field of the Invention

The present invention relates to a method for generating minimum shift keying (MSK) modulation signals and more particularly to a method for generating MSK modulation signals with reduced sidelobe energy relative to known MSK modulation techniques to reduce interference with colocated receiving equipment (cosite) and to reduce interference with adjacent channels in communication systems, such as single channel per carrier (SCPC) satellite links.

2. Description of the Prior Art

Methods for generating minimum shift keying (MSK) modulation signals are generally known in the art. Examples of apparatus for generating such MSK modulation signals are disclosed in U.S. Pat. Nos. 3,993,868; 4,516,087; 4,897,629 and 5,020,079. Known apparatus for decoding MSK modulation signals are disclosed in U.S. Pat. Nos. 4,942,592 and 5,170,131.

A baseband minimum shift keying (MSK) modulation signal is comprised of an in-phase component (I) or channel and a quadrature component or channel (Q). The in-phase component (I) and quadrature component (Q) are time offset from one another by 90°, such that the vector sum of the two components (I and Q) results a constant amplitude envelope, which can therefore be amplified, for example, by way of a non-linear class C amplifier.

Both the in-phase (I) and quadrature phase (Q) component signals are formed from half cycle sinusoidal waveforms of varying polarity, depending on the bit value being either a "0" or a "1". Even numbered bits are modulated by the in-phase component signal while odd numbered bits are generally modulated by the quadrature component signal (Q). When successive alternate bits with the same phase value are modulated, the sinusoidal waveforms will have the same polarity resulting in a relatively sharp discontinuity in the phase waveform. Such a discontinuity in the phase waveform results in high frequency components due to the non-continuous phase derivative which, in turn, results in spectrum spreading.

Various techniques are known for minimizing the spectral spreading in such a situation, for example, as disclosed in U.S. Pat. Nos. 4,516,087 and 4,897,620, hereby incorporated by reference. In the '620 patent, during a condition when successive alternate bits are to be modulated, a continuous transition modulation signal is utilized to maintain the continuity of the component signal waveform, (I or Q). As such, the first derivative of the phase waveform (i.e. frequency) during such sharp phase transitions will be continuous. In order to maintain a constant envelope amplitude, the other component signal (I or Q) is adjusted.

The technique disclosed in the '087 patent utilizes a predetermined number of stored modulation waveform patterns, selected as a function of the values of the successive alternate data bits for either the in-phase channel (I) and the quadrature phase channel (Q). The stored waveforms are used to smooth transitions of the phase waveform whenever the successive alternate data bits for either of the channels have the same value in order to prevent discontinuities. The other component signal is adjusted so that the sum of the component signals is constant.

While the techniques disclosed in the '087 and '620 patents reduce the spectral spreading of the MSK modulation signal and in particular reduce the sidelobe energy, such techniques are not suitable for use in all applications. For example, transmission of MSK modulation signals can interfere with colocated receiving equipment (cosite) or adjacent channels in the case of a single channel per carrier (SCPC) satellite links.

Cosite interference, for example, in a joint tactical information distribution system (JTIDS) application, arises when the transmit and receive antennas are sufficiently coupled and measures are not taken to filter the offending out-of-band transmitted spectrum. Interference can also occur over satellite channels in a single channel per carrier (SCPC) where out-of-band emissions are severely restricted by law.

SUMMARY OF THE THE INVENTION

It is an object of the present invention to solve various problems in the prior art.

It is yet another object of the present invention to provide a method for generating minimum shift keying (MSK) modulation signals with reduced sidelobe energy for minimizing the interference with colocated receiving equipment.

It is yet another object of the present invention to provide a method for generating MSK modulation signals which minimize interference with adjacent communication channels.

Briefly, the present invention relates to a method for generating minimum shift keying (MSK) modulation signals with relatively reduced energy sidelobes relative to known methods. In one embodiment of the invention, discontinuities in the baseband phase modulation signal are eliminated by utilizing a continuous sinusoidal MSK modulation signal; MSK (t)=exp $j\pi t d(i)/2T$, where $$A = 1/\int_0^x \mathrm{SIN}(x)dx,$$

t is time and $d(i)=\pm 1$ for a period T in an interval I. The time varying frequency term, $A \sin(\pi t/T)/2$ results in smooth phase waveform with a continuous first derivative (i.e. continuous frequencies). In an alternate embodiment, a second derivative of the phase waveform is taken and convolved with a selectable smoothing function and integrated twice to generate a smooth phase waveform S2D_ MSK (t)=$e^{j\phi(t)}$, where $$\phi(t) = k\int_0^t \int_0^y \phi''(x)dxdy,$$

where $\phi''(t)dt=d(i)_*u_0(t_1)_\otimes$
h(t) and $u_0(t)$ is an impulse function and h(t) is a smoothing function.$_\otimes$
—denotes convolution In the alternate embodiment, the sidelobe energy can be varied by simply changing the smoothing function, which can be stored in a lookup table. In this embodiment, the baseband complex modulation representation of the signal has a constant amplitude envelope allowing it to be transmitted using class C amplifiers. Since the embodiment ensures continuous phase derivative, the sidelobe energy being significantly reduced minimizes interference with other cosite equipment and nearby communication channels bands.

DESCRIPTION OF THE DRAWINGS

These and other embodiments of the present invention will be readily understood with reference to the following specification and attached drawing wherein.

DETAILED DESCRIPTION

A conventional minimum shift keying (MSK) modulated signal is generated by linearly increasing or decreasing the phase of a carrier 90°/data bit corresponding to a "0" or "1". The complex baseband minimum shift keying (MSK) modulation signal is provided in equation (1) below:

(1) $MSK(t)=\exp(j\pi t d(i))/2T$, where $d(i)=\pm 1$ where the phase term increases or decreases linearly by 90° over each interval T.

Figure 1:
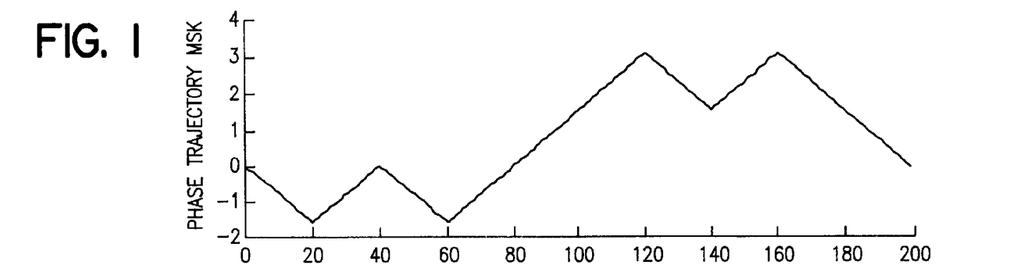
FIG. 1 is a graphical illustration of an MSK modulation signal in the time domain for a short random sequence of bits generated by conventional techniques.

As shown in FIG. 1, the conventional MSK modulation signal's phase trajectory is generally triangular over time yielding a frequency spectrum that rolls off roughly as $(\text{SIN}(f)/f)^2$, when averaged over all sequences. However, as stated above, such conventional MSK modulation signals are known to result in phase derivative discontinuities when successive alternate bits in either the in-phase channel (I) or quadrature channel (Q) have the same value, for example as shown at time T=140 in FIG. 1. Such a situation results in a discontinuity of the first derivative $(d\phi/dt)$. As is known in the art, the derivative $d\phi/dt$ is the frequency of the modulation signal. Such a discontinuity in the first derivative produces high frequency spectral energy components, manifested by spectral spreading of the MSK modulation signal as shown in FIG. 8.

Figure 2:
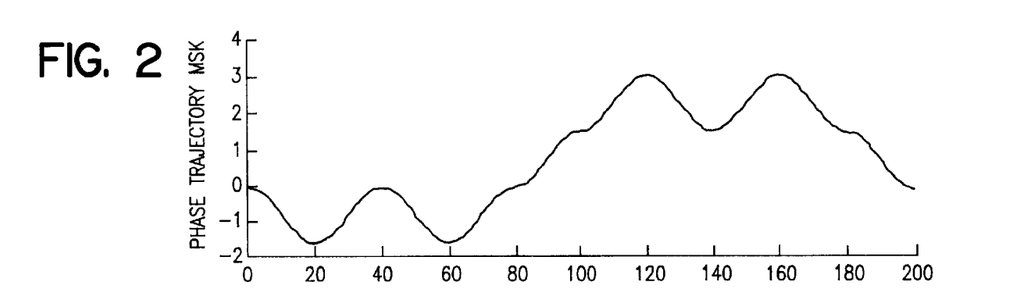
FIG. 2 is a graphical illustration of an MSK modulation signal in the time domain for the same short random sequencing bits in FIG. 1 generated by a technique in accordance with one embodiment of the present invention.

In accordance with a first embodiment of the present invention, to eliminate discontinuities in the first derivative of the MSK modulated signal, a continuous frequency minimum shift keying (CF_MSK) technique is provided. The CF_MSK technique smooths the phase discontinuities by increasing or decreasing the phase of the modulation signal in a continuous sinusoidal fashion as set forth in equation 2 below:

(2) $MSK(t)=\exp[j\pi t d(i) \, A \sin(\pi t/T)/2T]$, where $$A = 1/\int_0^x \text{SIN}(x)dx,$$

used to normalize the phase change per chip. The time varying frequency term $A \sin(\pi t/T)/2$ results in a smooth phase motion with a continuous derivative (i.e. continuous frequency). A CF_MSK modulation signal is illustrated in FIG. 2. As noted, the phase discontinuities, for example at T=140 have been smoothed out by the sinusoidal function.

Figure 3:
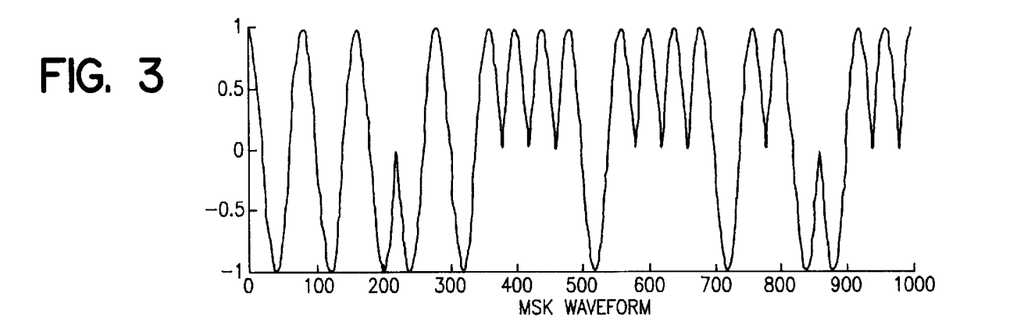
FIG. 3 is a graphical illustration of the in-phase component of the MSK modulation signal illustrated in FIG. 1.
Figure 4:
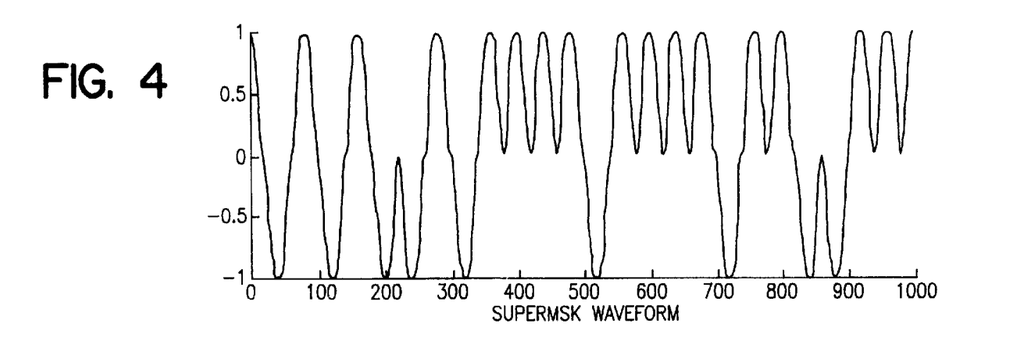
FIG. 4 is a graphical illustration of the in-phase component of the MSK modulation signal illustrated in FIG. 2.

As mentioned above, the MSK modulation signal can be broken down into two component signals; an in-phase signal (I) and a quadrature signal (Q). The in-phase component signal for both a conventional MSK modulation signal and a CF_MSK modulation signal in accordance with the present invention is illustrated in FIGS. 3 and 4, respectively. The quadrature component (Q) signals are similar to the in-phase component (I) signals. As shown, the signals are fairly similar except that the sharp signal transitions in FIG. 3 have been eliminated in FIG. 4.

Figure 5:
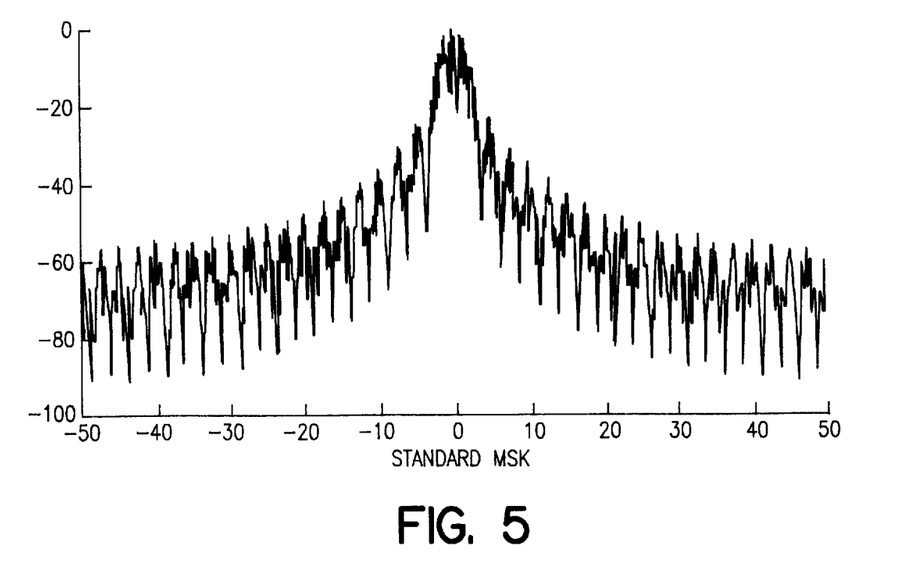
FIG. 5 is a graphical illustration of an MSK modulation signal in the frequency domain, generated by conventional techniques.
Figure 6:
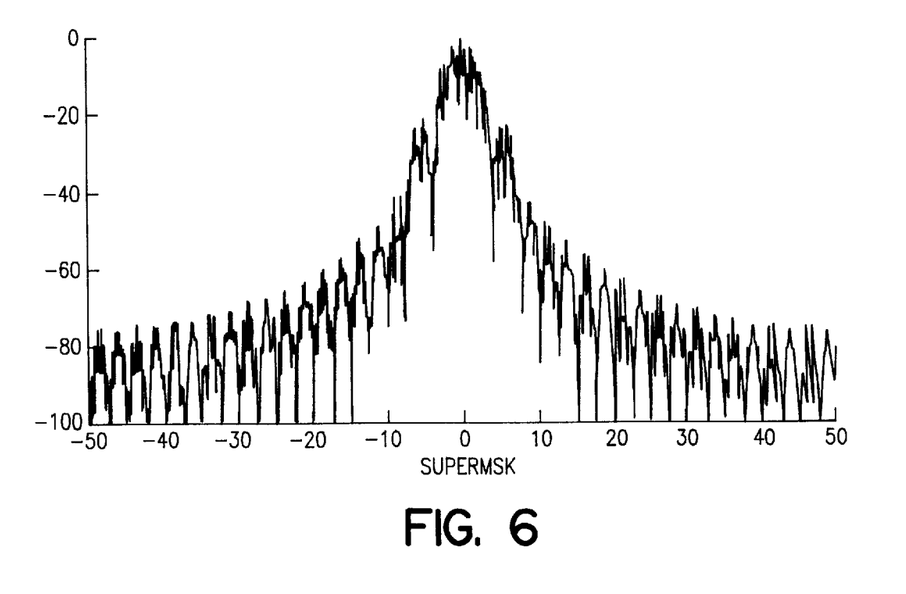
FIG. 6 is similar to FIG. 5, except the MSK modulation signal is generated by a technique in accordance with one embodiment of the invention.

FIGS. 5 and 6 illustrate an MSK signal generated by conventional techniques and an MSK signal generated by a technique in accordance with one embodiment of the invention, respectively; both in the frequency domain. As shown, at 50 MHz with 20 samples per data bit—a spectrum of a JTIDS signal with a 5 mbps chip rate from the carrier—the CF_MSK modulation signal is 20 db lower than the conventional MSK modulation signal. At 21 MHz away from the carrier, the CF_MSK signal is about 15 db lower in sidelobe energy. As such, in certain applications, the CF_MSK modulation signal can provide the same level of out-of-band transmitted energy as the conventional MSK signal with less required filtering or even lower out-of-band emissions with the same filtering. For example, in order for the sidelobe energy to be 60 db down at ±14 MHz, the CF_MSK modulation technique in accordance with the present invention can match this requirement with 5 db filtering where standard MSK filtering techniques require at least 15–20 db of filtering to meet the same value.

In an alternate embodiment of the invention, a second derivative of an MSK modulation is taken and convolved with a smoothing function. The resulting signal is then integrated twice to define the smooth phase function ø (i). The modulation signal in accordance with the alternate embodiment of the invention is generally set forth in equation 3 below:

(3) $S2D\_MSK(i)=e^{j\phi(i)}$

The technique for producing a modified MSK modulation signal S2D_MSK in accordance with equation 3 normally produces discontinuous derivatives beyond the first derivative. However, smoothing of the discontinuity in equation 3 forces all derivatives to be continuous. Thus, the S2D_MSK modulation technique plus the choice of the smoothing function as set forth below significantly reduces the out-of-band emission without affecting the near spectrum.

Figure 7:
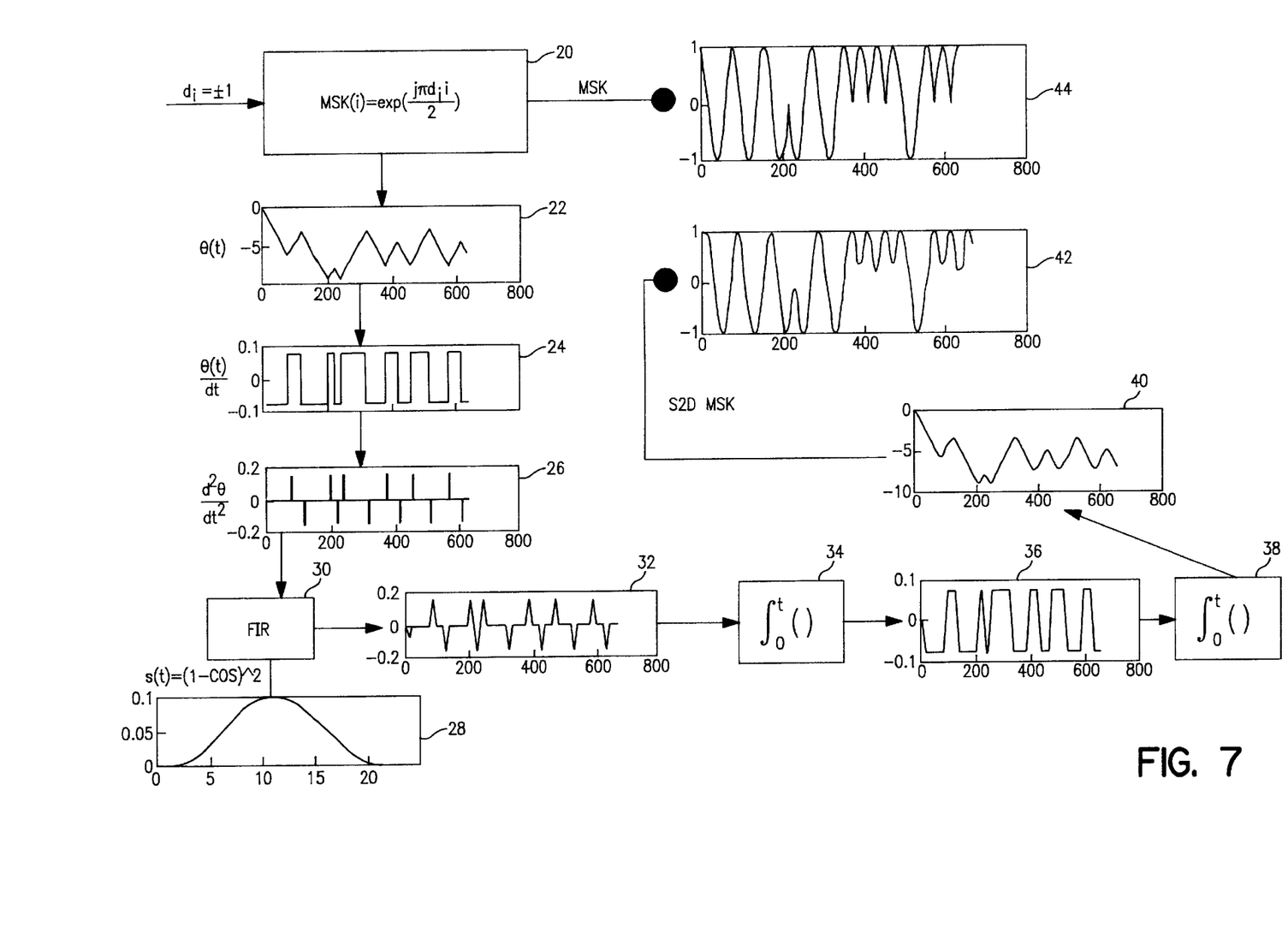
FIG. 7 is a block diagram illustrating a technique for generating an MSK modulation signal in accordance with an alternate embodiment of the invention.
Figure 8A:
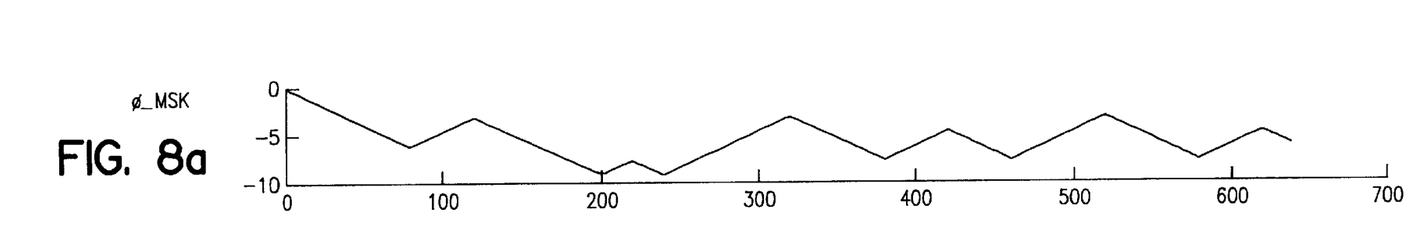
FIGS. 8a–8g are graphical illustrations of the waveforms in the time domain at very points along the block diagram illustrated in FIG. 7.
Figure 8B:
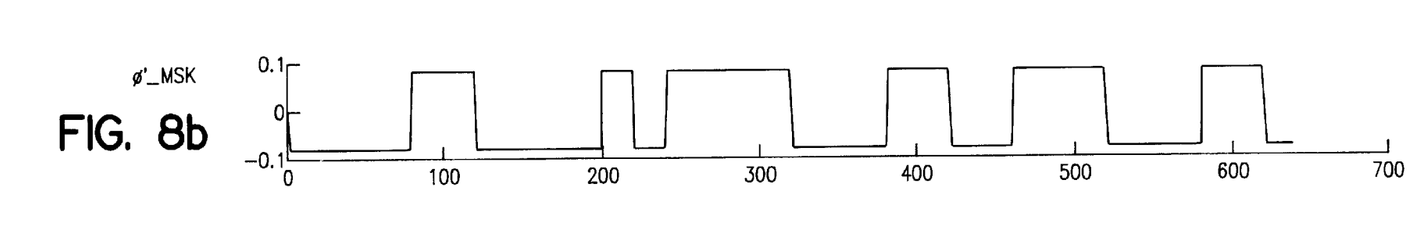
Figure 8C:
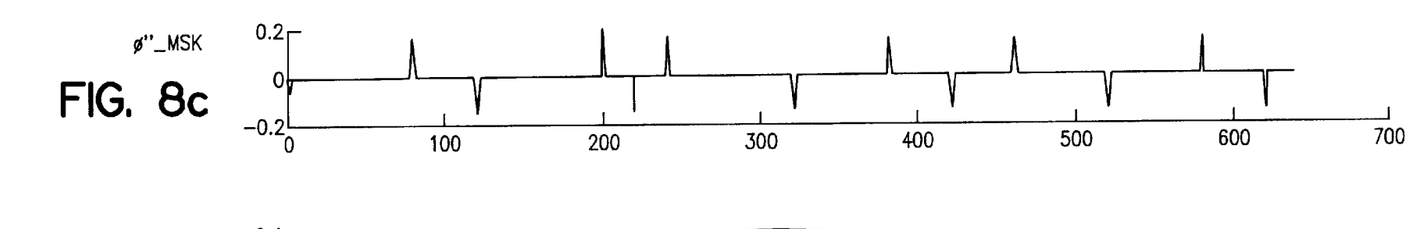
Figure 8D:
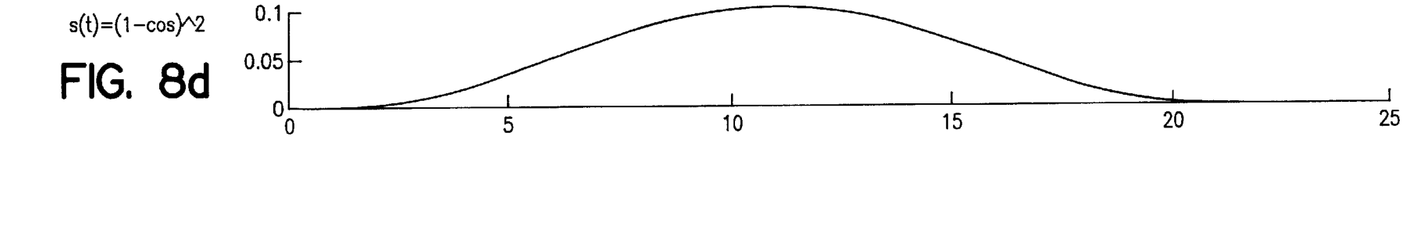

A technique for generating the S2D_MSK modulation signal is illustrated in FIG. 7. Initially, as illustrated in block 20, an MSK modulation signal is generated, for example by conventional techniques, by linearly increasing or decreasing the phase of the carrier 90°/data bit corresponding to a binary "0" or "1". As shown in block 22 and in FIG. 8a, the phase trajectory of the conventional MSK modulation signal has a triangular shape yielding a spectrum that falls off roughly as $(SIN (f)/f)^2$. Once the phase modulation signal ø (t) is generated, a first derivative of the phase modulation signal ø (t) is taken, as indicated by step 24 and illustrated in FIG. 8b. The first derivative ø'_MSK of the modulation signal ø (t) represents the frequency of the MSK modulation signal. As indicated in the block 26, a second derivative ø"_MSK of the modulation signal is taken which, as shown in block 26(FIG. 7) and FIG. 8c, consists of an impulse train.

Figure 8E:
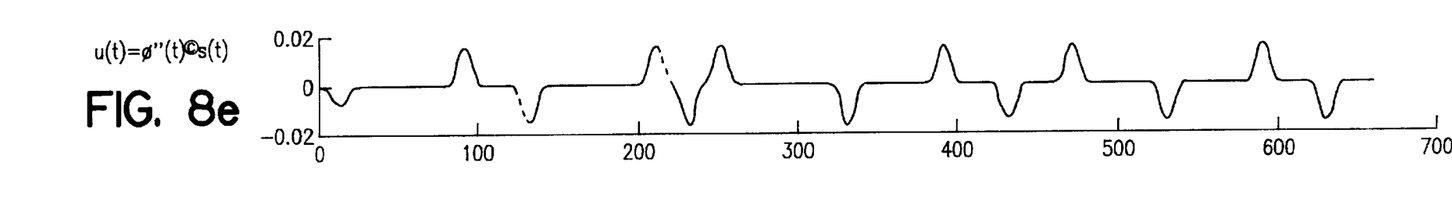
Figure 8F:
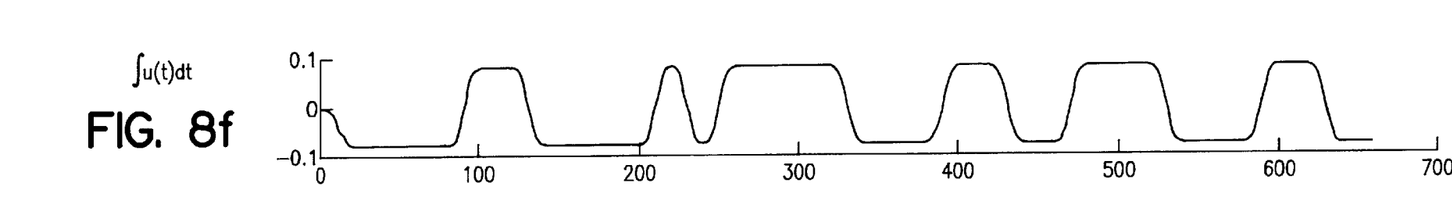
Figure 8G:
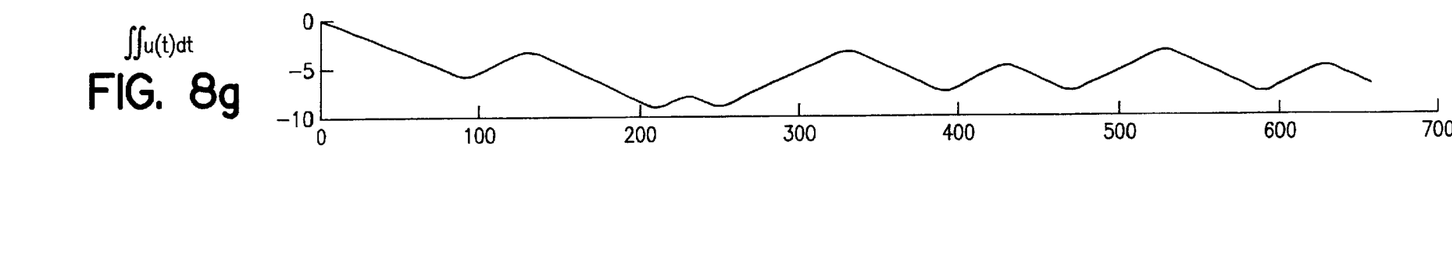
Figure 9:
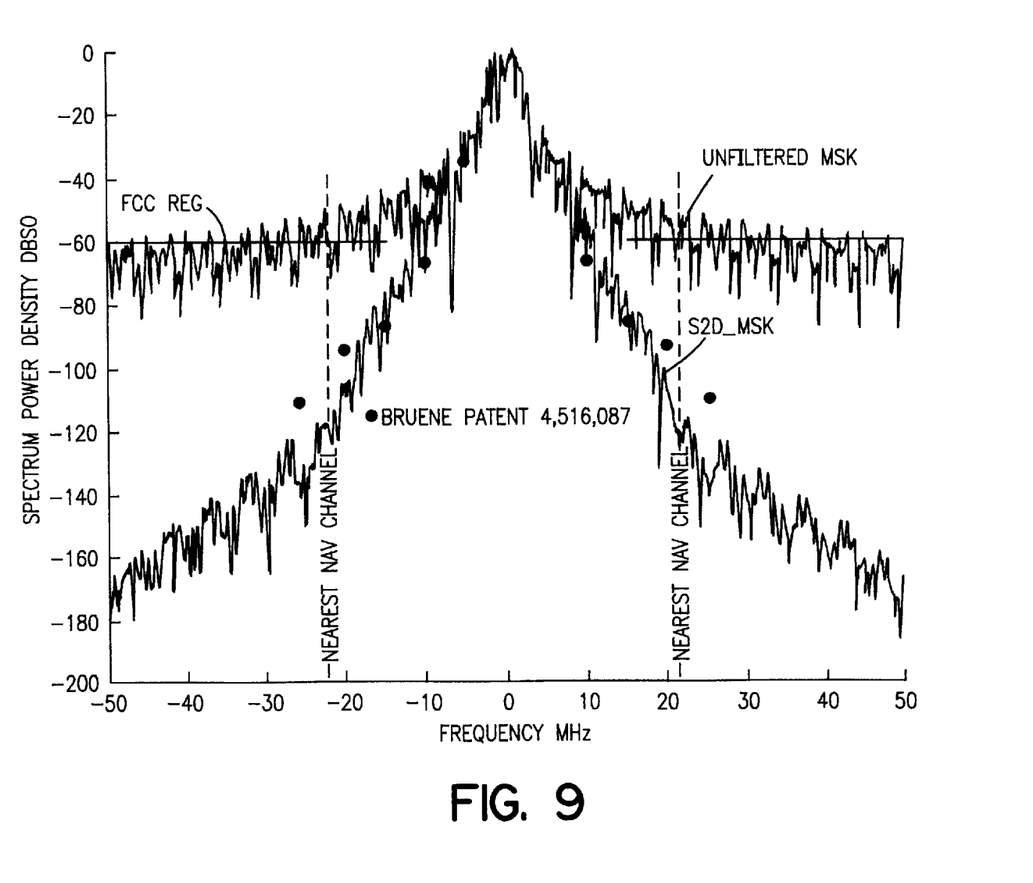
FIG. 9 is a graphical illustration in the frequency domain comparing a conventional unfiltered MSK signal, an MSK modulation signal utilizing a known technique for reducing sidelobe energy, and an MSK modulation signal generated by a technique in accordance with one embodiment of the present invention.

An important aspect of the invention relates to the ability to vary the sidelobe energy in the resulting S2D_MSK modulation signal as a function of the smoothing function selected. As shown in block 28, a smoothing function is selected, for example $s(t)=(1-\cos)^2$. The exemplary smoothing function shown is 20 samples long corresponding to a 100 MHz sampling rate. However, other smoothing functions, as discussed below, can be selected to vary the sidelobe energy. Once a smoothing function is selected, the smoothing function s(t) is convolved with the second derivative ø"_MSK obtained from block 26 by way of a finite impulse filter (FIR) 30, for example, as disclosed in Alan V. Oppenheim & Schafer, "Digital Signal Processing," Prentice-Hall, 1975 hereby incorporated by reference. The signal resulting from the convolution of the second derivative signal $ø^{11}$_MSK with the smoothing function $s(t)=(1-\cos)^2$ is a signal indicated by the block 32 (FIG. 7) and illustrated in FIG. 8e. The "smooth" second derivative is integrated twice as indicated by the blocks 34, 36, 38 and 40 and illustrated in FIGS. 8f and 8g to produce a signal $ø_s$ (i) in which the phase change per baud is always exactly 90°. Since the approach operates strictly in the phase domain, the technique produces a constant envelope signal. The final S2D_MSK modulation signal is then generated by inserting the signal $ø_s$ into the exponential operator $exp(j ø_s si)$ to form the in-phase (I) and quadrature (Q) component signals as indicated by the blocks 42 and 44.

Figure 10:
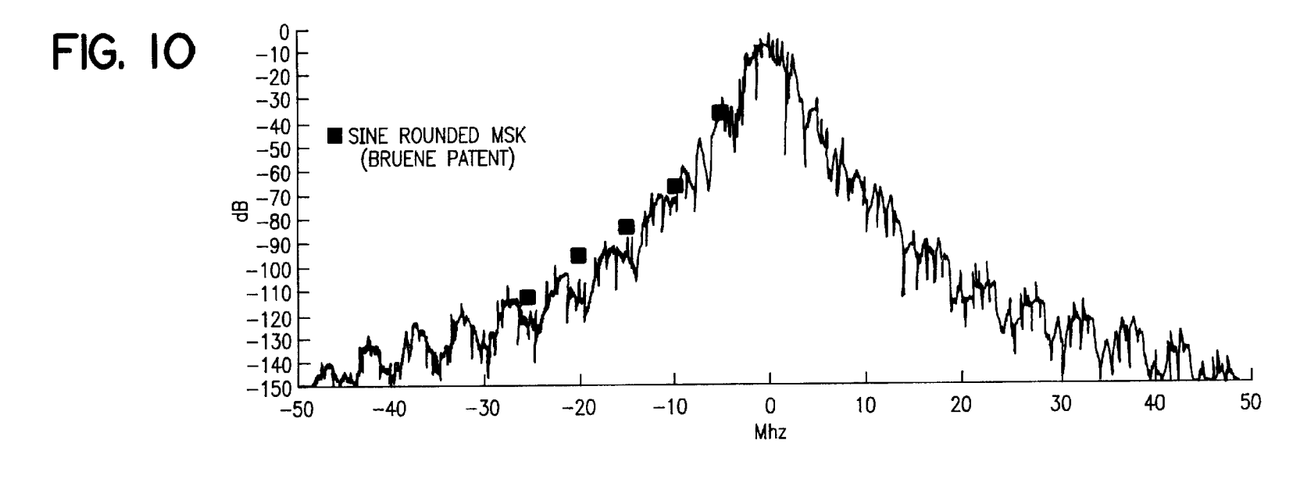
FIG. 10 is a graphical illustration of an MSK modulation signal generated by one technique in accordance with the present invention utilizing a (1-cos) smoothing function compared with an MSK modulation signal generated by a known technique.
Figure 11:
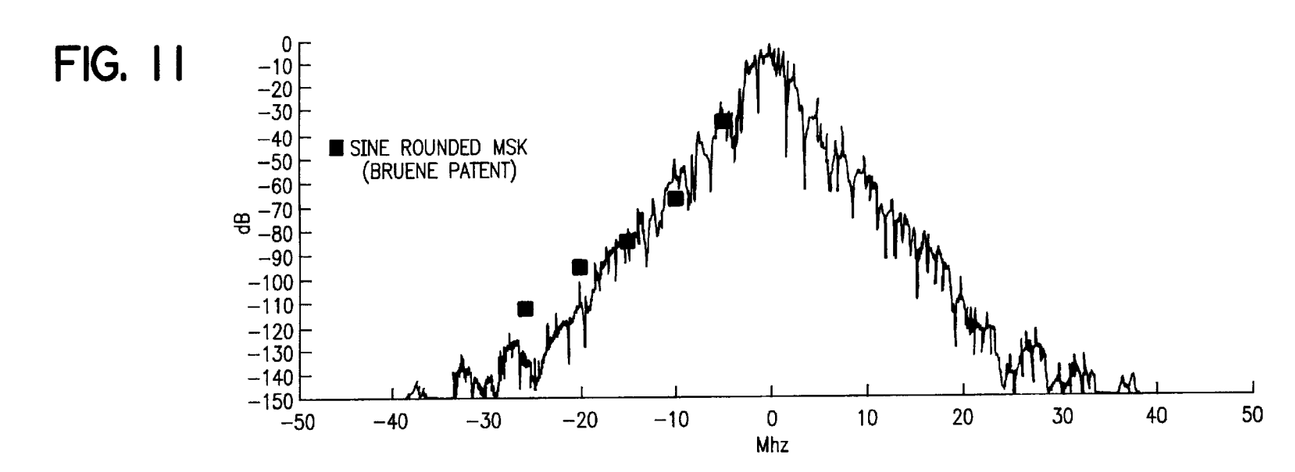
FIG. 11 is similar to FIG. 10 but for a $(1-\cos)^2$ smoothing function.
Figure 12:
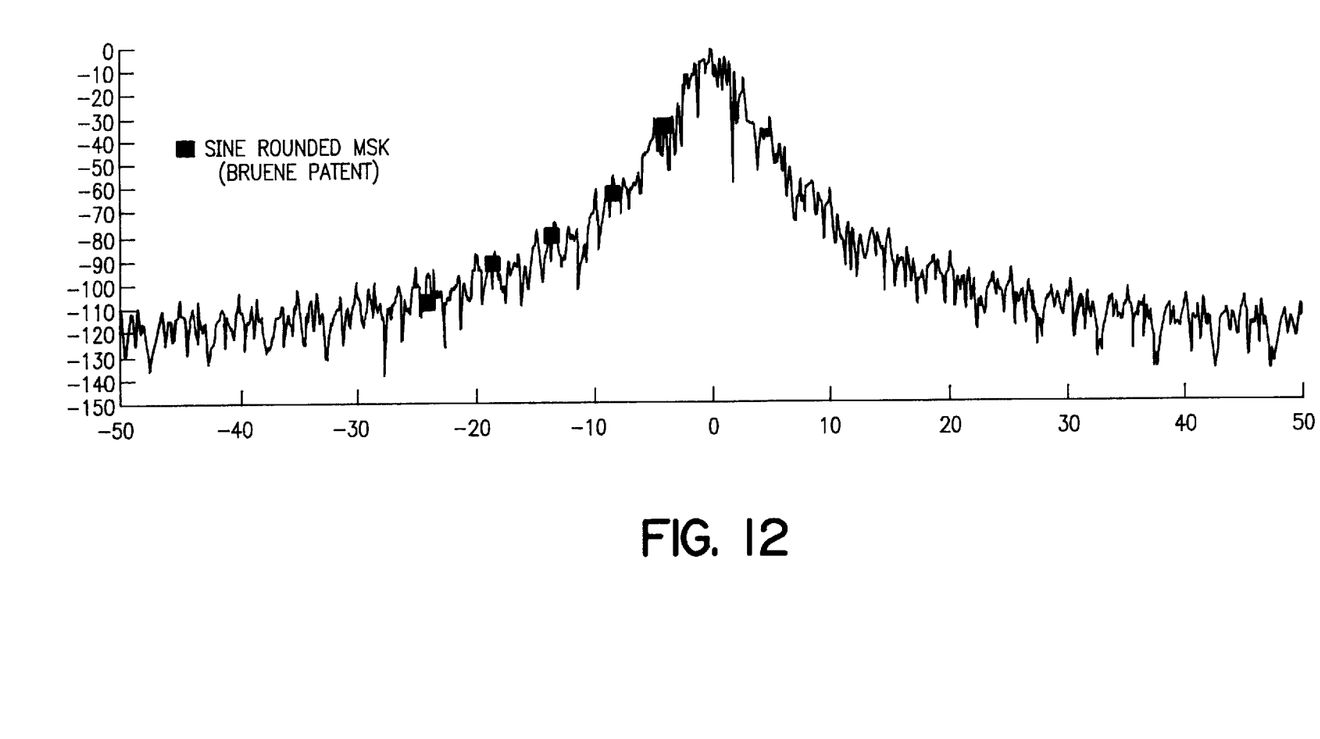
FIG. 12 is similar to FIG. 10 but for a $(1-\cos)^{1/2}$ smoothing function.
Figure 13:
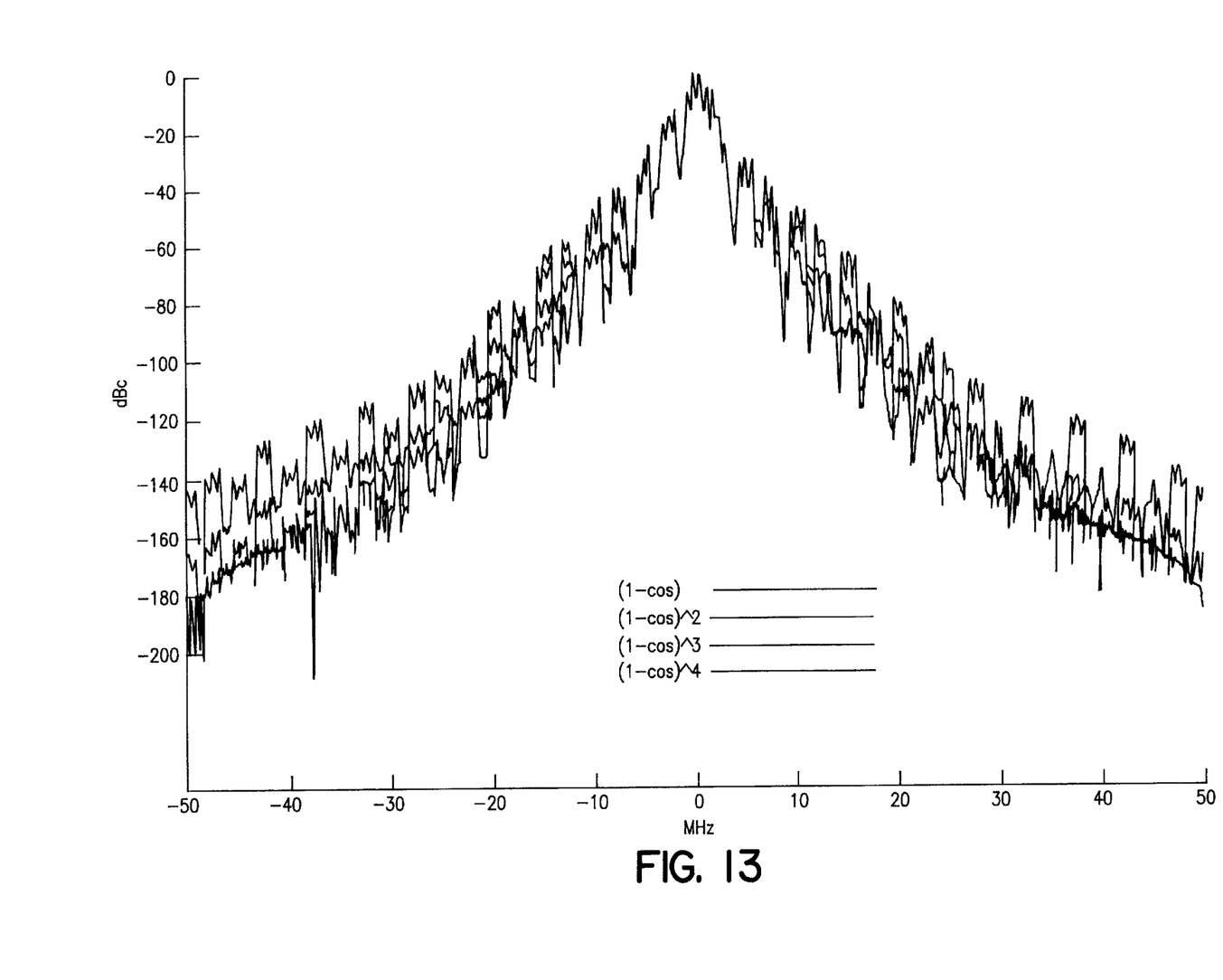
FIG. 13 is a graphical illustration of MSK modulation signals generated by different smoothing functions.

As mentioned above, other smoothing functions are also contemplated. For example, FIG. 10 illustrates an MSK modulation signal S2D_MSK utilizing an exemplary smoothing function s(t)=(1-cos). FIGS. 10–12 illustrate the modulation signals S2D-MSK in accordance with the present invention for smoothing functions s(t)=(1-cos); $s(t) =(1-\cos)^2$ and $s(t)=(1-\cos)^{1/2}$ respectively, compared with an MSK modulation signal generated by a known technique for reducing sidelobe energy. As shown, at ±20 MHz from the carrier, the sidelobe energy of the MSK modulation signals S2D_MSK is relatively less than the sidelobe energy generated by the known technique. As shown best in FIG. 13, the sidelobe energy for the modulation signals S2D_MSK with different smoothing functions also varies. For example, at 50 MHz from the carrier frequency, the spectral roll off varies from approximately −140 dBc to about −200 dBc. Thus, by storing various smoothing functions, the spectral roll off and hence the sidelobe energy can be controlled as a function of the selected smoothing function, which can be stored in a lookup table.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the united states is:

1. A method for generating a minimum shift keying (MSK) signal with reduced sidelobe energy comprising the steps of:

(a) differentially encoding data bits;

(b) modulating said differentially encoded bits according to a modulation function MSK(t)=exp, where d(i) is ±1, T is the period, I is the interval and t is line, where $$A = 1/\int_0^x SIN(x)dx,$$

T=the period and t=time.

2. A method for generating a minimum shift keying (MSK) signal with reduced sidelobe energy comprising the steps of:

(a) differentially encoding data bits;

(b) modulating said differentially encoded bits to create a time varying frequency in the form of A Sin (πt/T)/2, where $$A = 1/\int_0^x SIN(x)dx,$$

T=the period and t=time.

3. A system for generating minimum shift keying (MSK) signal with reduced sidelobe energy comprising:

(a) differentially encoding the data bits;

(b) modulating said differentially encoded bits to create a time varying frequency in the form of A Sin (πt/T)/2.

4. A system for generating minimum shift keying (MSK) signal with reduced sidelobe energy comprising:

(a) differentially encoding the data;

(b) modulating said bits to create a time varying frequency term A Sin (πt/T)/2.

5. A method for generating a minimum shift keying (MSK) signal with reduced sidelobe energy comprising the steps of:

(a) generating an MSK modulation signal;

(b) taking a first derivative of said MSK modulation signal;

(c) taking a second derivative of said MSK modulation signal;

(d) convolving said derivative signal with a predetermined smoothing function defining a convolved signal; integrating said convolved signal, and (f) second integrating said convolved signal.

6. The method as recited in claim 5, wherein said smoothing function s(t)=(1-cos)

7. The method as recited in claim 5, wherein said smoothing function $s(t)=(1-\cos)^2$.

8. The method as recited in claim 5, wherein said smoothing function $(1-\cos)^3$.

9. The method as recited in claim 5, wherein said smoothing function $(1-\cos)^4$.

10. The method as recited in claim 5, wherein said smoothing function $(1-\cos)^{1/2}$.

11. The method as recited in claim 5, wherein a plurality of smoothing functions are stored and said method includes the step of selecting a stored smoothing function.

12. A system for generating an MSK modulation signal with reduced energy sidelobes confirming:

means for generating an MSK modulation signal; and means for selectively varying the sidelobe energy of said MSK modulation signal.

13. The system as recited in claim 12, wherein said varying means includes means for storing a plurality of predetermined smoothing functions, wherein different smoothing functions result in MSK modulation signals with different sidelobe energies.

14. The system as recited in claim 13, wherein one of said plurality of smoothing functions is $s(t)=(1-\cos)$.

15. The system as recited in claim 13, wherein one of said plurality of smoothing functions is $s(t)=(1-\cos)^2$.

16. The method as recited in claim 13, wherein said smoothing function $(1-\cos)^3$.

17. The method as recited in claim 13, wherein said smoothing function $(1-\cos)^4$.

18. The method as recited in claim 13, wherein said smoothing function $(1-\cos)^{1/2}$.

19. The system as recited in claim 12, wherein said generating means includes means for generating a conventional MSK modulation signal.

20. The system as recited in claim 16, wherein said generating means includes means for taking a second derivative of said conventional MSK modulation signal defining a second derivative signal.

21. The system as recited in claim 20, wherein said varying means includes means for convolving said second derivative signal with a predetermined smoothing signal to define a convolved signal.

22. The system as recited in claim 21, wherein said varying means includes means for double integrating said convolved signal.

\* \* \* \* \*